US011469891B2

(12) United States Patent
Daniel

(10) Patent No.: US 11,469,891 B2
(45) Date of Patent: Oct. 11, 2022

(54) EXPENDABLE CRYPTOGRAPHIC KEY ACCESS

(71) Applicant: British Telecommunications Public Limited Company, London (GB)

(72) Inventor: Joshua Daniel, London (GB)

(73) Assignee: British Telecommunications Public Limited Company, London (GB)

( * ) Notice: Subject to any disclaimer, the term of this patent is extended or adjusted under 35 U.S.C. 154(b) by 249 days.

(21) Appl. No.: 16/620,260

(22) PCT Filed: Jun. 11, 2018

(86) PCT No.: PCT/EP2018/065303
§ 371 (c)(1),
(2) Date: Dec. 6, 2019

(87) PCT Pub. No.: WO2018/228974
PCT Pub. Date: Dec. 20, 2018

(65) Prior Publication Data
US 2021/0099299 A1    Apr. 1, 2021

(30) Foreign Application Priority Data

Jun. 12, 2017 (EP) .................................. 17175393

(51) Int. Cl.
*H04L 9/08* (2006.01)
*G06Q 20/06* (2012.01)
(Continued)

(52) U.S. Cl.
CPC ....... *H04L 9/0894* (2013.01); *G06Q 20/0658* (2013.01); *H04L 9/0819* (2013.01);
(Continued)

(58) Field of Classification Search
None
See application file for complete search history.

(56) References Cited

U.S. PATENT DOCUMENTS 6,535,493 B1    3/2003   Lee et al.
8,590,057 B1    11/2013  Mayblum et al.
(Continued)

FOREIGN PATENT DOCUMENTS

CN    107018432 A    8/2017
GB    2540976 A      2/2017
(Continued)

OTHER PUBLICATIONS

Antonopoulos A M., "Mastering Bitcoin-Unlocking Digital Crypto-Currencies," Apr. 2014, Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.

(Continued)

*Primary Examiner* — William J. Goodchild
(74) *Attorney, Agent, or Firm* — Patterson Thuente IP

(57) ABSTRACT

A computer implemented method of a receiving secure computing component to provide access to a cryptographic key for a key requester, the key being associated with an owning secure computing component by a digitally signed record in a blockchain wherein the blockchain is accessible via a network and includes a plurality of records validated by miner computing components, wherein the key requester has associated a quantity of cryptocurrency by a digitally signed record in the blockchain, the method including: receiving a request from the key requester to access the key; generating a first new record for storage in the blockchain to transfer a predetermined quantity of cryptocurrency associated with the requester to be associated with the receiving component, the first new record being validated by the miner components; responsive to the validation of the first new record, communicating a request to the owning component to transfer the key to the receiving component; responsive to
(Continued)

securely receiving the key at the receiving component and a validation of a second new record in the blockchain, the second new record associating the key with the receiving component, providing the requester with secure access to the key.

13 Claims, 3 Drawing Sheets

(51) Int. Cl.
  *H04L 9/32* (2006.01)
  *H04L 9/00* (2022.01)

(52) U.S. Cl.
  CPC .......... *H04L 9/0877* (2013.01); *H04L 9/0891* (2013.01); *H04L 9/3236* (2013.01); *H04L 9/3247* (2013.01); *H04L 9/50* (2022.05); *H04L 2209/56* (2013.01)

(56) References Cited

U.S. PATENT DOCUMENTS

| | | |
|---|---|---|
| 9,807,106 B2 | 10/2017 | Daniel |
| 10,534,913 B2 | 1/2020 | Daniel |
| 10,839,378 B1 | 11/2020 | Srinivasan et al. |
| 2004/0213260 A1 | 10/2004 | Leung et al. |
| 2005/0009517 A1 | 1/2005 | Maes |
| 2011/0130117 A1 | 6/2011 | Fan et al. |
| 2012/0044862 A1 | 2/2012 | Chen et al. |
| 2013/0044733 A1 | 2/2013 | Jang |
| 2014/0323088 A1 | 10/2014 | Hsieh |
| 2014/0355520 A1 | 12/2014 | Wallis |
| 2014/0355564 A1 | 12/2014 | Cherian et al. |
| 2015/0040195 A1 | 2/2015 | Park et al. |
| 2015/0181424 A1 | 6/2015 | Hardy |
| 2015/0373029 A1 | 12/2015 | Evenden et al. |
| 2016/0142911 A1 | 5/2016 | Kreiner et al. |
| 2016/0180338 A1 | 6/2016 | Androulaki et al. |
| 2016/0183081 A1 | 6/2016 | Flores Cuadrado et al. |
| 2016/0261690 A1 | 9/2016 | Ford |
| 2016/0364787 A1* | 12/2016 | Walker .................. H04L 9/0891 |
| 2017/0053460 A1 | 2/2017 | Hauser et al. |
| 2017/0124534 A1 | 5/2017 | Savolainen |
| 2017/0132630 A1* | 5/2017 | Castinado .......... G06Q 20/4014 |
| 2017/0206523 A1* | 7/2017 | Goeringer ............... G06F 21/45 |
| 2018/0025166 A1 | 1/2018 | Daniel |
| 2018/0197173 A1 | 7/2018 | Durvasula et al. |
| 2018/0285615 A1 | 10/2018 | Daniel |
| 2018/0322259 A1 | 11/2018 | Solow et al. |
| 2019/0108364 A1 | 4/2019 | Roennow et al. |
| 2019/0230491 A1 | 7/2019 | Yu et al. |
| 2019/0253409 A1 | 8/2019 | Spencer |
| 2019/0386832 A1 | 12/2019 | Palyutina et al. |
| 2020/0007316 A1 | 1/2020 | Krishnamacharya et al. |
| 2020/0242603 A1 | 7/2020 | Salkintzis |
| 2020/0380090 A1 | 12/2020 | Marion |

FOREIGN PATENT DOCUMENTS

| | | | |
|---|---|---|---|
| GB | 2540977 A | 2/2017 | |
| WO | WO-2016128491 A1 * | 8/2016 | ........... G06F 21/602 |
| WO | WO2017021153 | 2/2017 | |
| WO | WO2017021154 | 2/2017 | |
| WO | WO2017021155 | 2/2017 | |
| WO | WO2017167547 | 10/2017 | |
| WO | WO2017167548 | 10/2017 | |
| WO | WO2017167549 | 10/2017 | |
| WO | WO-2017184160 A1 | 10/2017 | |
| WO | WO-2018125989 A2 * | 7/2018 | ........... H04W 12/69 |
| WO | WO2018178026 | 10/2018 | |
| WO | WO2018178034 | 10/2018 | |
| WO | WO2018178035 | 10/2018 | |
| WO | WO2018206374 | 11/2018 | |
| WO | WO2018206405 | 11/2018 | |
| WO | WO2018206406 | 11/2018 | |
| WO | WO2018206407 | 11/2018 | |
| WO | WO2018206408 | 11/2018 | |
| WO | WO-2018228973 A1 | 12/2018 | |
| WO | WO-2018228974 A1 | 12/2018 | |

OTHER PUBLICATIONS

Combined Search and Examination Report under Sections 17 and 18(3) for Great Britain Application No. 1709275.0, dated Dec. 1, 2017, 8 pages.

Combined Search and Examination Report under Sections 17 and 18(3) for Great Britain Application No. 1809489.6, dated Dec. 10, 2018, 8 pages.

Deloitte, "Blockchain @ Telco How Block Chain Can Impact the Telecommunications Industry and Its Relevance to the C-Suite Introduction to Block Chain," retrieved from https://www2.deloitte.com/content/dam/Deloitte/za/Documents/technology-media-telecommunications/za_TMT_Blockchain_TelCo.pdf,Nov. 28, 2016, pp. 9-20.

Dorri A., et al., "Blockchain for IoT Security and Privacy: The Case Study of a Smart Home," 2nd IEEE PERCOM Workshops, 2017, 7 pages.

Extended European Search Report for Application No. 17175392.4, dated Nov. 29, 2017, 8 pages.

Extended European Search Report for Application No. 17175393.2, dated Dec. 4, 2017, 8 pages.

International Preliminary Report on Patentability for Application No. PCT/EP2018/065303, dated Dec. 26, 2019, 8 pages.

International Preliminary Report on Patentability for Application No. PCT/EP2018/065233, dated Dec. 26, 2019, 10 pages.

International Preliminary Report on Patentability for Application No. PCT/EP2018/065235, dated Dec. 26, 2019, 8 pages.

International Preliminary Report on Patentability for Application No. PCT/EP2018/065234, dated Dec. 26, 2019, 8 pages.

International Preliminary Report on Patentability for Application No. PCT/EP2018/065302, dated Dec. 26, 2019, 7 pages.

International Search Report and Written Opinion for Application No. PCT/EP2018/065233, dated Jul. 10, 2018, 12 pages.

International Search Report and Written Opinion for Application No. PCT/EP2018/065235, dated Sep. 3, 2018, 9 pages.

International Search Report and Written Opinion for Application No. PCT/EP2018/065302, dated Aug. 3, 2018, 8 pages.

International Search Report and Written Opinion for Application No. PCT/EP2018/065303, dated Aug. 6, 2018, 11 pages.

International Search Report and Written Opinion for Application No. PCT/EP2018/065234, dated Sep. 3, 2018, 9 pages.

Jover R.P., et al., "dHSS- Distributed Peer-to-Peer Implementation of the LTE HSS Based on the Bitcoin/Namecoin Architecture," 2016 IEEE International Conference on Communications Workshops (ICC), IEEE, May 23, 2016, pp. 354-359.

Sanda T., et al., "Proposal of New Authentication Method in Wi-Fi Access Using Bitcoin 2.0," 2016 IEEE 5th Global Conference on Consumer Electronics, IEEE, Oct. 11, 2016, pp. 1-5.

Search Report under Section 17 for Great Britain Application No. 1709276.8, dated May 8, 2018, 4 pages.

Application and File History for U.S. Appl. No. 16/620,241, filed Dec. 6, 2019, Inventor: Daniel.

Application and File History for U.S. Appl. No. 16/620,277, filed Dec. 6, 2019, Inventor: Daniel.

Application and File History for U.S. Appl. No. 16/620,328, filed Dec. 6, 2019, Inventor: Daniel.

Application and File History for U.S. Appl. No. 16/620,355, filed Dec. 6, 2019, Inventor: Daniel.

Bitfury Group Limited, "Bitfury: On Blockchain Auditability," Nov. 14, 2016, Retrieved from the Internet: URL: https://bitfury.com/content/downloads/bitfury_white_paper_on_blockchain_auditability.pdf on Jun. 19, 2020, 40 pages.

Combined Search and Examination Report under Sections 17 and 18(3) dated Nov. 7, 2017 for Great Britain Application No. 1709272.7, 8 pages.

(56) References Cited

OTHER PUBLICATIONS

Combined Search and Examination Report under sections 17 & 18(3) for Great Britain Application No. 1709273.5, dated Nov. 7, 2017, 8 pages.
Combined Search and Examination Report under sections 17 & 18(3) for Great Britain Application No. 1709274.3, dated Oct. 31, 2017, 8 pages.
Communication pursuant to Article 94(3) EPC for Application No. 18728662.0, dated Jan. 26, 2021, 6 pages.
Communication pursuant to Article 94(3) EPC for Application No. 18728662.0, dated Oct. 28, 2021, 6 pages.
Communication pursuant to Article 94(3) EPC For European Application No. 18728429.4, dated Feb. 4, 2021, 7 pages.
Communication pursuant to Article 94(3) EPC For European Application No. 18728430.2, dated Feb. 4, 2021, 7 pages.
Communication pursuant to Article 94(3) EPC For European Application No. 18728663.8, dated Jan. 26, 2021, 7 pages.
Examination Report under Section 18(3) for Great Britain Application No. 1709275.0, dated Jul. 8, 2020, 5 pages.
Extended European Search Report for Application No. 17175391.6, dated Nov. 14, 2017, 8 pages.
Extended European Search Report for Application No. 17175394.0, dated Nov. 14, 2017, 8 pages.
Extended European Search Report for Application No. 17175395.7, dated Aug. 10, 2017, 11 pages.
Noting of Loss of Rights Pursuant to Rule 112(1) EPC for 18728428.6, dated Aug. 21, 2020, 1 page.
Communication pursuant to Article 94(3) EPC for Application No. 18728430.2 dated Apr. 21, 2022, 6 pages.

\* cited by examiner

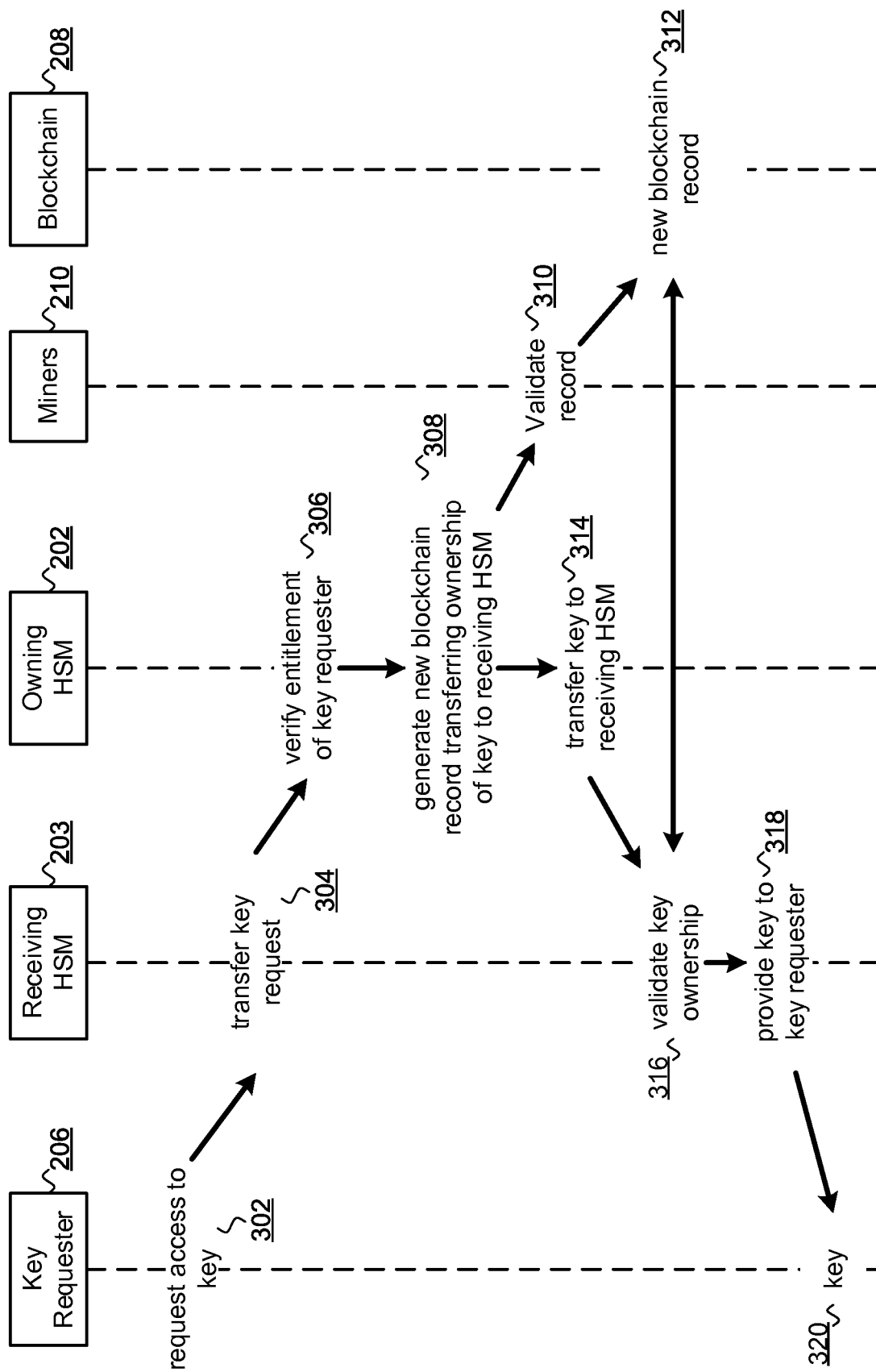

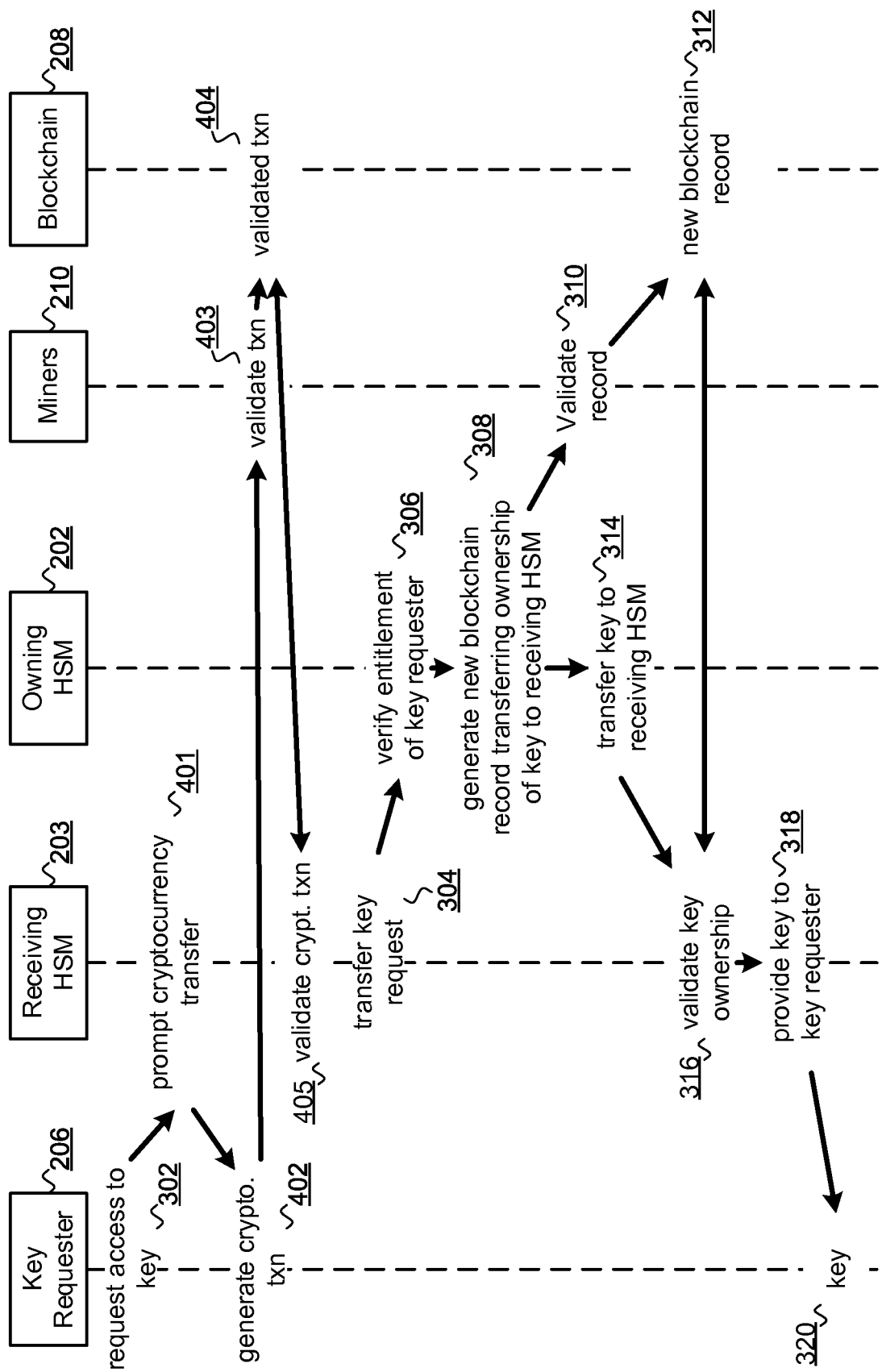

US 11,469,891 B2

EXPENDABLE CRYPTOGRAPHIC KEY ACCESS

CROSS-REFERENCE TO RELATED APPLICATIONS

The present application is a National Phase entry of PCT Application No. PCT/EP2018/065303, filed Jun. 11, 2018, which claims priority from European Patent Application No. 17175393.2 filed Jun. 12, 2017, each of which is fully incorporated herein by reference.

TECHNICAL FIELD

The present disclosure relates to improvements to hardware security modules.

BACKGROUND

Hardware Security Modules (HSMs) are network-connected physical devices tasked with the secure generation, storage and provision of cryptographic keys for use by consuming resources such as computer systems, appliances, devices, software and users. For example, HSMs generate, store and provide public/private key pairs. Increasingly it is necessary for consumers of such keys to require transitioning of the keys between HSMs such that a key generated/managed by a first HSM is securely transitioned for management by a second HSM. For example, transfer may be required due to geography, network topology or a need to migrate from the first HSM (e.g. in the event of fault, deprecation etc.)

While the transfer of a key from a source HSM to a target HSM can be readily effected, certainty of the transfer for consuming resources and non-repudiation of the transfer must be assured.

SUMMARY

Thus, there is a need to address these challenges while providing for the requisite secure and reliable transfer of keys with certainty of key ownership and non-repudiation of the transfer.

The present disclosure accordingly provides, in a first aspect, a computer implemented method of a receiving secure computing component to provide access to a cryptographic key for a key requester, the key being associated with an owning secure computing component by a digitally signed record in a blockchain wherein the blockchain is accessible via a network and includes a plurality of records validated by miner computing components, wherein the key requester has associated a quantity of cryptocurrency by a digitally signed record in the blockchain, the method comprising: receiving a request from the key requester to access the key; generating a first new record for storage in the blockchain to transfer a predetermined quantity of cryptocurrency associated with the requester to be associated with the receiving component, the first new record being validated by the miner components; responsive to the validation of the first new record, communicating a request to the owning component to transfer the key to the receiving component; responsive to securely receiving the key at the receiving component and a validation of a second new record in the blockchain, the second new record associating the key with the receiving component, providing the requester with secure access to the key.

In some embodiments the owning component verifies an entitlement of the requester to access the key.

In some embodiments the owning component generates the record in the blockchain associating the key with the receiving component.

In some embodiments the second new record is validated by the miner components.

In some embodiments the second new record in the blockchain includes a reference to the original record for the key such that the second new record supersedes the original record to associate the key with the other receiving component and to disassociate the key from the owning computing component.

In some embodiments the entitlement of the requester is verified based on identification information for the requester.

In some embodiments each of the receiving and owning secure computing components are hardware security modules (HSMs).

In some embodiments at least some of the miner components are hardware security modules (HSMs).

In some embodiments the blockchain is a distributed transactional database.

In some embodiments the miner components confirm a state of the blockchain by reaching a consensus as to the state of the blockchain based on a proof of work.

In some embodiments an insufficiency of a quantity of cryptocurrency associated with the key requester precludes access, by the key requester, to the key.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 3 is a flow diagram of a method of providing access to a cryptographic key for a key requester according to embodiments of the present disclosure.

FIG. 4 is a flow diagram of a method of providing access to a cryptographic key for a key requester according to alternative embodiments of the present disclosure.

DETAILED DESCRIPTION OF THE DRAWINGS

Figure 1:
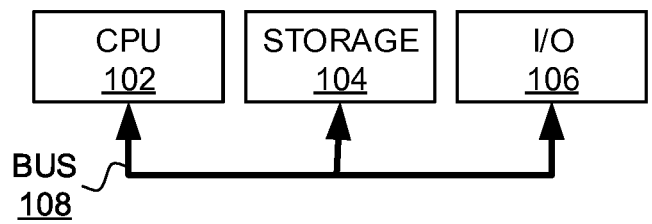
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
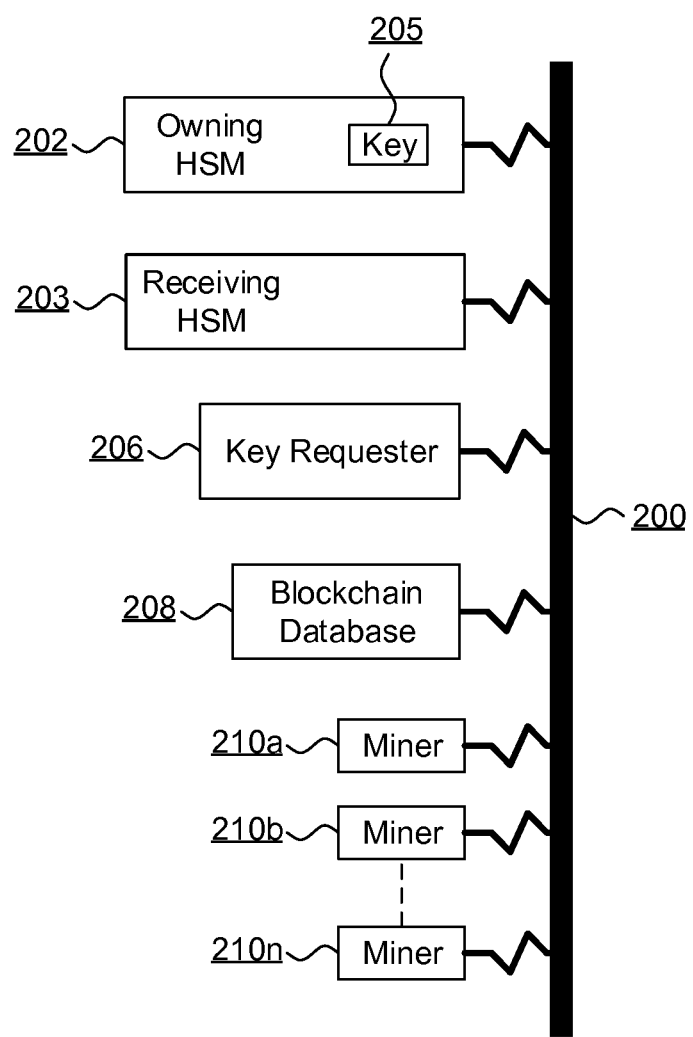
FIG. 2 is a component diagram of an arrangement for providing access to a cryptographic key for a key requester according to embodiments of the present disclosure.

FIG. 2 is a component diagram of an arrangement for providing access to a cryptographic key 205 for a key requester 206 according to embodiments of the present disclosure. A key requester 206 is a hardware, software, firmware or combination component for consuming a cryptographic key 205 in a computing system. For example, the requester 206 can be a computer system or a software component executing within a computer system. In some embodiments, the requester 206 can be a computing facility such as a device employed by a user to access and/or use a cryptographic key 205. The key 205 can be a single cryptographic or digital key or a combination of two or more keys for use together and/or in conjunction, such as a key pair. In some embodiments, the key 205 is dedicated to the key requester 206 such that the requester 206 is intended to have exclusive use of the key 205.

The key 205 is generated, stored, managed and/or made available by a secure computing component. Such a secure computing component can be a hardware, software, firmware or combination component. In the illustrated embodiment, the secure computing component is a hardware security module (HSM) 202 that can be said to have "ownership" of the key 205 by way of being responsible for the key 205. For example, the owning HSM 202 can be responsible for the storage, provision, security or otherwise making available and handling of the key 205. In preferred embodiments, a single HSM owns the key 205 at a point in time such that only one HSM is able to store, provision, handle and/or make available the key 205 at a point in time.

A second secure computing component, referred to as a receiving secure computing component, is represented in the illustrated embodiments as receiving HSM 203. Initially, the receiving HSM 203 does not have access to the key 205. In use, the receiving HSM 203 receives a request from the key requester 206 to access, receive, retrieve or otherwise handle the key 205. Embodiments of the present invention provide a mechanism for providing the requester 206 with access to the key 205 via the receiving HSM 203 in a secure manner.

The arrangement of FIG. 2 further includes a computer network 200 such as a wired, wireless, or combination network. The network connects each of the owning HSM 202, the receiving HSM 203 and the requester 206. Additionally, communicatively connected to the network 200, or communicable by the network 200, is a distributed sequential transactional database such as a blockchain database 208.

Distributed sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database is herein referred to as a blockchain though it will be appreciated that other suitable databases, data structures or mechanisms possessing the characteristics essential for embodiments of the present invention could alternatively be used. A blockchain is a distributed chain of block data structures accessed by a network of nodes, referred to here as a miner network. Each block in the blockchain includes a plurality of record data structures known as transactions, each transaction referring or relating to a prior transaction. For example, in one embodiment each blockchain includes a Merkle of hash or digest values for transactions included in the block to arrive at a hash value for the block, which is itself combined with a hash value for a preceding block to generate a chain of blocks (blockchain). A new block of transactions is added to the blockchain by miner software, hardware, firmware or combination systems 210 in a miner network. The miners 210 are communicatively connected to sources of transactions and access or copy the blockchain 208. A miner 210 undertakes validation of the substantive content of a transaction and adds a block of new transactions to the blockchain 208 when a challenge is satisfied as a proof of work, typically such challenge involving a combination hash or digest for a prospective new block and a preceding block in the blockchain 208 and some challenge criterion. Thus, miners 210 in the miner network may each generate prospective new blocks for addition to the blockchain 208. Where a miner 210 satisfies or solves the challenge and validates the transactions in a prospective new block such new block is added to the blockchain 208. Accordingly, the blockchain 208 provides a distributed mechanism for reliably verifying a data entity. The detailed operation of such blockchains and the function of miners in a miner network is beyond the scope of this specification. The manner in which the blockchain 208 and network of miners 210 operate promotes the adoption of verifiably valid transactions as new blocks added to a blockchain 208 in a manner that is persistent within the blockchain 208. Transactions added erroneously or maliciously are not verifiable by other miners 210 in the network and their persistence in the blockchain 208 is undermined. This attribute of blockchains can be exploited by embodiments of the present invention to provide a verifiable and non-repudiable ownership of the key 205 at a point in time as described below with reference to FIGS. 3 and 4.

Notably, in some embodiments, either or each of the owning HSM 202 and the receiving HSM 203 are additionally miners in the miner network. Further, in some embodiments, the miners 210 include HSMs and/or other computing components.

FIG. 3 is a flow diagram of a method of providing access to a cryptographic key 205 for a key requester 206 according to embodiments of the present disclosure. Initially, at 302, the key requester 206 requests access to the key 205 from the receiving HSM 203. The receiving HSM 203 communicates 304 a request to the owning HSM 202 to transfer the key 205, and ownership of the key 205, to the receiving HSM 203 in order that the requester's request can be satisfied.

At 306 the owning HSM 202 verifies an entitlement of the requester 206 to access the key 205. This verification can be achieved based on identification information for the requester 206 that can be provided by the requester 206, such as via the receiving HSM 203. Responsive to the verification of entitlement of the requester 206, the owning HSM 202 generates 308 a new record (a transaction) for storage in the blockchain 208 to record a transfer of ownership of the key 205 from the owning HSM 202 to the receiving HSM 203. The record is provided to miners 210 in the miner network for validation 310 and eventual commitment to the blockchain 208 as a new blockchain record 312, such as a new transaction as part of a new validated block of transactions.

At 314 (which may be dependent on the confirmed validation of the new blockchain record 312 by miners 310), the owning HSM 202 securely transfers the key 205 to the receiving HSM 203. The receiving HSM 203 validates 316 that it has valid ownership of the key 205 with reference to, and validation of, the new blockchain record 312 in the blockchain 208. Subsequently, the receiving HSM 203 securely provides 318 the key 205 to the requester 206.

The use of the blockchain 208 to record validated transfers of ownership of the key 205 provides a reliable, commonly accessible and commonly validated record of ownership of the key 205 with protection from repudiation. In some embodiments, the key 205 is provided to requester 206 only by an owning HSM such that a transfer of ownership of the key 205 effects a change to the HSM for providing the key 205.

The transfer of the key 205 is provided in the blockchain 208 by the new blockchain record 312 which provides an association between the receiving HSM 203 and the key 205. In some embodiments, the original ownership of the key 205 by the owning HSM 202 (prior to a transfer of ownership to the receiving HSM 203) is also recorded by a record in the blockchain 208, i.e. an original record of ownership of the key 205 which associates the owning HSM 202 with the key 205. In this way, the new blockchain record 312 that transfers ownership of the key 205 to the receiving HSM 203 supersedes the original record, and the key 205 becomes associated with the receiving HSM 203, and disassociated from the owning HSM 202, by way of the new record 312. Preferably, this superseding of the original record is achieved by a reference, in the new blockchain record 312, to the original record such as by way of a hash or some such of the original record included in the new record 312 that is then digitally signed by the receiving HSM 203 and/or the owning HSM 202. This is consistent with the typical nature of blockchains in which each subsequent block of transactions includes a signed hash of an immediately preceding block so as to provide the irrefutable chaining of blocks and, therefore, the advantages of the blockchain.

In some security architectures and/or policies, access to, use of and/or availability of secure resources such as cryptographic keys can be limited such that there are constraints on a use, rate of use or extent of use of such resources. Embodiments of the present disclosure are capable of supporting such models of resource use as described below.

FIG. 4 is a flow diagram of a method of providing access to a cryptographic key 205 for a key requester 206 according to alternative embodiments of the present disclosure. In the arrangement according to FIG. 4, the key requester 206 additionally has associated a quantity of fiat value recorded in the blockchain 208. Such fiat value can be realized as, for example, a cryptocurrency such as bitcoin, Ethereum ether or the like. Actions relating to the key 205 can be defined to involve the consumption of such fiat value according to a predetermined policy. For example, a transfer of ownership of the key 205 for the requester 206 can involve the expenditure of cryptocurrency of the requester 206 as a mechanism for constraining a number of such transfers, or to impose a restriction on such transfers relative to a resource cost of such transfers or a resource cost of such ownership by the receiving HSM 203. For example, such resource cost can include a volume or quantity of computing resources consumed or forecast to be consumed by the receiving HSM 203 due to the encumbrance of the receiving HSM 203 by the transfer and/or ownership of the key 205.

According to the flow of FIG. 4, at 302 the requester initially sends a request to the receiving HSM 203 to access the key 205. Subsequently, the receiving HSM 203 prompts the transfer of a predetermined quantity of cryptocurrency 401 by the requester 206. The transfer can be in favor of the receiving HSM 203 such that the receiving HSM 203 receives the cryptocurrency transferred by the requester 206. At 402 the requester 206 generates a new cryptocurrency transaction 402 for submission to miners 210. The miners 210 validate the transaction 403 which becomes committed to the blockchain 208 as a validated transaction 404. Subsequently, at 405, the receiving HSM 203 seeks to validate the cryptocurrency transaction 404 to confirm that the transfer took place and there is an appropriate expenditure of cryptocurrency by the requester 206. Where such validation is affirmative, the receiving HSM 203 proceeds from 304 as previously described with respect to FIG. 3 to effect a transfer of ownership of the key 205 and provision of the key to the requester 206.

Notably, where the transfer or cryptocurrency is not completed, such as due to an insufficient quantity of cryptocurrency associated with the requester 206 or an insufficient volume of currency transferred, then the key transfer process from 304 does not take place. In this way, the extent of access and ownership transfer of the key 205 can be constrained.

Thus, in use, two new blockchain records are created as part of the process of FIG. 4. A first new blockchain record (transaction) is generated, validated and committed to the blockchain 208 to effect the transfer of cryptocurrency. A second new blockchain record (transaction) is generated, validated and committed to the blockchain 208 to effect the transfer or ownership of the key 205.

While the arrangement of FIG. 4 is described such that the cryptocurrency transactions are validated by the same miners 210 and stored in the same blockchain 208 as the key ownership records, it will be apparent to those skilled in the art that a separate blockchain or other sequential distributed transactional database may be employed for the cryptocurrency transactions.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the invention is not limited thereto and that there are many possible variations and modifications which fall within the scope of the claims.

The scope of the present includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of a receiving secure computing component to provide access to a cryptographic key for a key requester, the cryptographic key being associated with an owning secure computing component by a digitally signed record in a blockchain, wherein the blockchain is accessible via a network and includes a plurality of records validated by miner computing components, wherein the key requester has associated a quantity of cryptocurrency by a digitally signed record in the blockchain, the method comprising:
   receiving a request from the key requester to access the cryptographic key;
   generating a first new record for storage in the blockchain to transfer a predetermined quantity of cryptocurrency associated with the key requester to be associated with the receiving secure computing component, the first new record being validated by the miner computing components if the predetermined quantity of cryptocurrency is transferred;
   responsive to the validation of the first new record, communicating a request to the owning secure computing component to transfer the cryptographic key to the receiving secure computing component; and
   responsive to securely receiving the cryptographic key at the receiving secure computing component and a validation of a second new record in the blockchain, the second new record associating the cryptographic key with the receiving secure computing component, providing the key requester with secure access to the cryptographic key.

2. The method of claim 1, wherein the owning secure computing component verifies an entitlement of the key requester to access the cryptographic key.

3. The method of claim 1, wherein the owning secure computing component generates the second new record in the blockchain associating the cryptographic key with the receiving secure computing component.

4. The method of claim 1, wherein the second new record is validated by the miner computing components.

5. The method of claim 1, wherein the second new record in the blockchain includes a reference to the original record for the cryptographic key such that the second new record supersedes the original record to associate the cryptographic key with the receiving secure computing component and to disassociate the key from the owning secure computing component.

6. The method of claim 1, wherein the entitlement of the key requester is verified based on identification information for the key requester.

7. The method of claim 1, wherein each of the receiving secure computing component and the owning secure computing component is a hardware security module (HSM).

8. The method of claim 1, wherein at least some of the miner computing components are hardware security modules (HSMs).

9. The method of claim 1, wherein the blockchain is a distributed transactional database.

10. The method of claim 1, wherein the miner computing components confirm a state of the blockchain by reaching a consensus as to the state of the blockchain based on a proof of work.

11. The method of claim 1, wherein an insufficiency of a quantity of cryptocurrency associated with the key requester precludes access, by the key requester, to the cryptographic key.

12. A computer system comprising:
   a processor and memory storing computer program code for a receiving secure computing component to provide access to a cryptographic key for a key requester, the cryptographic key being associated with an owning secure computing component by a digitally signed record in a blockchain, wherein the blockchain is accessible via a network and includes a plurality of records validated by miner computing components, wherein the key requester has associated a quantity of cryptocurrency by a digitally signed record in the blockchain, by:
      receiving a request from the key requester to access the cryptographic key;
      generating a first new record for storage in the blockchain to transfer a predetermined quantity of cryptocurrency associated with the key requester to be associated with the receiving secure computing component, the first new record being validated by the miner computing components if the predetermined quantity of cryptocurrency is transferred;
      responsive to the validation of the first new record, communicating a request to the owning secure computing component to transfer the cryptographic key to the receiving secure computing component; and
      responsive to securely receiving the cryptographic key at the receiving secure computing component and a validation of a second new record in the blockchain, the second new record associating the cryptographic key with the receiving secure computing component, providing the key requester with secure access to the cryptographic key.

13. A non-transitory computer-readable storage element storing a computer program element comprising computer program code to, when loaded into a computer system and executed thereon, cause the computer system to provide access to a cryptographic key for a key requester by a receiving secure computing component, the cryptographic key being associated with an owning secure computing component by a digitally signed record in a blockchain, wherein the blockchain is accessible via a network and includes a plurality of records validated by miner computing components, wherein the key requester has associated a quantity of cryptocurrency by a digitally signed record in the blockchain, by:
   receiving a request from the key requester to access the cryptographic key;
   generating a first new record for storage in the blockchain to transfer a predetermined quantity of cryptocurrency associated with the key requester to be associated with the receiving secure computing component, the first new record being validated by the miner computing components if the predetermined quantity of cryptocurrency is transferred;
   responsive to the validation of the first new record, communicating a request to the owning secure computing component to transfer the cryptographic key to the receiving secure computing component; and
   responsive to securely receiving the cryptographic key at the receiving secure computing component and a validation of a second new record in the blockchain, the second new record associating the cryptographic key with the receiving secure computing component, providing the key requester with secure access to the cryptographic key.

\* \* \* \* \*